(12) United States Patent
Kesselberg

(10) Patent No.: US 10,697,901 B2
(45) Date of Patent: Jun. 30, 2020

(54) PIPE INSPECTION DEVICE

(71) Applicant: VRETMASKIN EL & MEKANIK AB, Sundbyberg (SE)

(72) Inventor: Jakob Kesselberg, Alvsjo (SE)

(73) Assignee: Vretmaskin El & Mekanik AB (SE)

( * ) Notice: Subject to any disclaimer, the term of this patent is extended or adjusted under 35 U.S.C. 154(b) by 85 days.

(21) Appl. No.: 14/897,354

(22) PCT Filed: Jun. 12, 2013

(86) PCT No.: PCT/SE2013/050685
§ 371 (c)(1),
(2) Date: Dec. 10, 2015

(87) PCT Pub. No.: WO2014/200398
PCT Pub. Date: Dec. 18, 2014

(65) Prior Publication Data
US 2016/0139061 A1    May 19, 2016

(51) Int. Cl.
*G01N 21/954*    (2006.01)
*G03B 37/00*     (2006.01)
(Continued)

(52) U.S. Cl.
CPC .......... *G01N 21/954* (2013.01); *G01M 3/38* (2013.01); *G01N 21/8806* (2013.01);
(Continued)

(58) Field of Classification Search
None
See application file for complete search history.

(56) References Cited

U.S. PATENT DOCUMENTS 3,539,915 A * 11/1970 Wood .................. G01N 27/904
324/220
3,718,758 A * 2/1973 Ponghis .................... C21B 7/24
348/83
(Continued)

FOREIGN PATENT DOCUMENTS

CA    2256185 A1    6/2000
CA    2438644 A1 *  3/2004  ....... G08B 13/19619
(Continued)

OTHER PUBLICATIONS

International Search Report dated Feb. 7, 2014 corresponding to International Patent Application No. PCT/SE2013/050685, 4 pages.
(Continued)

*Primary Examiner* — Jayanti K Patel
*Assistant Examiner* — Stefan Gadomski
(74) *Attorney, Agent, or Firm* — Foley & Lardner LLP

(57)    ABSTRACT

A pipe inspection device includes a housing (1) fixed to a semi-rigid rod (2) and having a longitudinal axis (3) and inside the housing a camera (4) having a forward-looking field of view and a camera (5) rotatable around said longitudinal axis (3) and having a field of view directed to permit closer inspection of an inner surface of the pipe, and means (17-24) for rotating the rotatable camera (5) to direct its field of view against an area of the inner surface of the pipe to be inspected more closely. To make it possible to inspect the inner surface of a pipe faster than with prior art devices, the inspection device has at least two cameras (5-7) in addition to the camera (4) having a forward-looking field. Said at least two cameras (5-7) are rotatable as an assembly around the longitudinal axis and have a field of view directed to permit closer inspection of an inner surface of the pipe. Further, the housing (1) has a fixed rear part (10) and a front part (11) that is carried by the rear part (10) and rotatable
(Continued)

around said longitudinal axis (3), all of the cameras (4-7) being fixed in the rotatable front part (11) of the housing (1).

18 Claims, 3 Drawing Sheets

(51) Int. Cl.
    *G03B 15/03*     (2006.01)
    *G03B 37/04*     (2006.01)
    *G03B 37/02*     (2006.01)
    *G01M 3/38*     (2006.01)
    *G01N 21/88*     (2006.01)
    *H04N 5/225*     (2006.01)
    *H04N 5/232*     (2006.01)
    *H04N 7/18*     (2006.01)
    *F16L 101/30*     (2006.01)

(52) U.S. Cl.
    CPC ........... *G03B 15/03* (2013.01); *G03B 37/005* (2013.01); *G03B 37/02* (2013.01); *G03B 37/04* (2013.01); *H04N 5/2252* (2013.01); *H04N 5/2256* (2013.01); *H04N 5/23238* (2013.01); *H04N 7/181* (2013.01); *F16L 2101/30* (2013.01); *G01N 2201/062* (2013.01)

(56) References Cited

U.S. PATENT DOCUMENTS

| | | | | |
|---|---|---|---|---|
| 4,281,929 A * | 8/1981 | Lord | G02B 23/26 | 356/241.1 |
| 4,521,026 A * | 6/1985 | Eide | F16J 15/406 | 277/430 |
| 5,107,286 A * | 4/1992 | Sergeant | H04N 5/2252 | 348/81 |
| 5,390,846 A * | 2/1995 | Thode | B23K 9/164 | 219/74 |
| 5,893,703 A * | 4/1999 | Weinrib | F04D 29/108 | 277/345 |
| 5,929,347 A * | 7/1999 | Matsuura | G01N 1/04 | 73/863.01 |
| 6,174,000 B1 * | 1/2001 | Nishi | E21B 17/042 | 285/333 |
| 6,208,809 B1 * | 3/2001 | Kanai | G03B 17/04 | 396/131 |
| 6,545,704 B1 * | 4/2003 | Olsson | G01M 3/005 | 348/84 |
| 6,611,661 B2 | 8/2003 | Buck | | |
| 6,697,102 B1 * | 2/2004 | Olsson | E21B 47/0002 | 324/323 |
| 2003/0198374 A1 * | 10/2003 | Hagene | G01N 21/954 | 382/141 |
| 2004/0020270 A1 * | 2/2004 | Kuikka | B08B 9/0433 | 73/49.5 |
| 2005/0104600 A1 * | 5/2005 | Cotton | B08B 9/049 | 324/519 |
| 2005/0217394 A1 * | 10/2005 | Langley | G01B 5/066 | 73/865.8 |
| 2005/0275725 A1 | 12/2005 | Olsson et al. | | |
| 2006/0164512 A1 * | 7/2006 | Hinn | G01M 3/005 | 348/84 |
| 2007/0034265 A1 * | 2/2007 | Mohr | F16L 27/0828 | 137/580 |
| 2007/0087194 A1 * | 4/2007 | Singer | C03B 5/1675 | 428/379 |
| 2007/0104478 A1 * | 5/2007 | Takahashi | G08B 13/19626 | 396/427 |
| 2009/0028543 A1 * | 1/2009 | Park | G03B 17/00 | 396/428 |
| 2009/0078283 A1 * | 3/2009 | Phipps | F16L 55/38 | 134/8 |
| 2010/0060904 A1 * | 3/2010 | Keightley | G01B 11/2513 | 356/608 |
| 2010/0157043 A1 * | 6/2010 | Demers | G01B 11/14 | 348/84 |
| 2010/0295927 A1 * | 11/2010 | Turner | H04N 13/221 | 348/50 |
| 2010/0328796 A1 * | 12/2010 | Wang | G02B 26/007 | 359/889 |
| 2011/0063449 A1 | 3/2011 | Lee | | |
| 2011/0095752 A1 * | 4/2011 | Short | F16L 55/38 | 324/220 |
| 2011/0306834 A1 * | 12/2011 | Schrader | A61B 1/00066 | 600/112 |
| 2011/0317286 A1 * | 12/2011 | Drost | G03B 3/02 | 359/798 |
| 2012/0098955 A1 * | 4/2012 | Krywyj | G01M 3/005 | 348/84 |
| 2012/0147173 A1 * | 6/2012 | Lynch | G03B 37/005 | 348/84 |
| 2012/0253130 A1 * | 10/2012 | Motoyama | A61B 1/0011 | 600/182 |
| 2013/0188012 A1 * | 7/2013 | Bellis | H04N 5/2252 | 348/42 |
| 2014/0009598 A1 * | 1/2014 | O'Donnell | G01M 3/005 | 348/84 |
| 2014/0152802 A1 * | 6/2014 | Olsson | A61B 1/05 | 348/84 |
| 2014/0192180 A1 * | 7/2014 | Sooy | G03B 37/005 | 348/85 |
| 2014/0207419 A1 * | 7/2014 | Messinger | G01N 27/90 | 703/1 |
| 2014/0210989 A1 * | 7/2014 | Olsson | H04N 5/232 | 348/84 |
| 2014/0267586 A1 * | 9/2014 | Aguilar | H04N 5/23238 | 348/36 |
| 2015/0124088 A1 * | 5/2015 | Vera | G08B 13/19632 | 348/143 |
| 2015/0204383 A1 * | 7/2015 | Ishii | F16C 33/201 | 384/297 |

FOREIGN PATENT DOCUMENTS

| | | | | |
|---|---|---|---|---|
| EP | 0029343 A2 | | 5/1981 | |
| GB | 2342419 A | | 4/2000 | |
| JP | 2007082372 A | * | 3/2007 | |
| JP | 4535974 B2 | * | 9/2010 | |
| WO | WO-9722030 A2 | * | 6/1997 | ............... E03F 7/12 |
| WO | 2012/167380 A1 | | 12/2012 | |

OTHER PUBLICATIONS

Written Opinion of the International Searching Authority dated Feb. 7, 2014 corresponding to International Patent Application No. PCT/SE2013/050685, 6 pages.

Chinese Office Action dated Jul. 18, 2016 in Chinese Application No. 201380078128.3, 6 pages.

Australian Examination Report No. 1, dated Sep. 19, 2017, in corresponding Australian Application No. 2013392147, 4 pages.

* cited by examiner

PIPE INSPECTION DEVICE

CROSS-REFERENCE TO RELATED APPLICATIONS

This application claims priority to PCT/SE2013/050685, filed Jun. 12, 2013, which is incorporated by reference in its entirety.

TECHNICAL FIELD

The present invention relates to a pipe inspection device including a housing fixed to a semi-rigid rod and having a longitudinal axis and inside the housing a camera having a forward-looking field of view and a camera rotatable around said longitudinal axis and having a field of view directed to permit closer inspection of an inner surface of the pipe, and means for rotating the rotatable camera to direct its field of view against an area of the inner surface of the pipe to be inspected more closely.

BACKGROUND ART

Devices for inspecting the inner side of a pipe generally comprise a casing, inside which is mounted a camera having a forward-looking view and a separate light source. The device is fixed to one end of a semi-rigid rod, which is pushed down a pipe to be inspected. The rod encloses wires for supply of electrical power to the device from a supply outside the pipe and at the same time image signals from the camera to a monitor outside the pipe. On pushing the camera along the pipe, the casing with the camera tends to rotate about its longitudinal axis, so that the image displayed on the monitor is similarly rotated, which makes it difficult to determine the orientation of an image.

To maintain the attitude of the camera it is suggested in U.S. Pat. No. 6,611,661 B1 (Buck) and US 2005/0275725 A1 (Olsson et al.) to make the camera self-leveling by using a leveling weight and mount the camera and the weight freely rotatable within the housing, such that gravitational forces maintain the rotational orientation (attitude) of the camera independent of the housing. None of these two documents discloses the use of a second camera directed to permit closer inspection of an inner surface of the pipe.

A pipe inspection device having two cameras, one for looking forward and one for looking sideways to inspect the inner wall of the pipe fore closely is disclosed in GB 2 342 419 A (Pearpoint Ltd.). The two cameras form an assembly that is rotatable around the longitudinal axis inside the housing, and the sideways looking camera is directed strictly sideways, at a right angle to the longitudinal axis of the housing, and to make it possible for the camera to see the pipe wall, the housing has a circumferential window. The rotation is accomplished by a motor provided inside the casing and, if desired, a sensor may be provided for driving the motor in response to changes in the attitude of the device.

To protect this circumferential window from getting scratched or mechanically damaged in some other way during use of the inspection device, the outer diameter of the window is recessed in comparison with the outer diameter of adjacent portions of the housing. However, to form such a recess, the diameter of adjacent portions of the housing have to be increased, which is a drawback, since it is desirable to make the diameter of the housing as small as possible. Further, such a recess will increase the risk of the inspection device getting stuck in the pipe during inspection thereof, and the recess will also be exposed to accumulation of dirt therein, and irrespective of any rotation of the camera, the rotatable camera cannot inspect pipe surface areas hidden behind the accumulated dirt on the window.

In addition, the camera assembly may require a rotation of up to 180° from a normal top position in order to inspect an area at the bottom of the pipe, and every rotation is time-consuming, even if the rotation is smaller than 180°. To cover an entire pipe a full rotation of 360° may be required.

In addition, the camera assembly may require a rotation of up to 180° from a normal top position in order to inspect an area at the bottom of the pipe, and every rotation is time-consuming, even if the rotation is smaller than 180°.

SUMMARY OF THE INVENTION

The main object of the present invention is to provide a pipe inspection device with reduced dimensions by means of which an inspection of the inner surface of a pipe can be carried out faster than with prior art devices.

The object is achieved in accordance with the present invention in that in a pipe inspection device of the kind referred to in the first paragraph above:
a) in addition to the camera having a forward-looking field, the inspection device has at least two cameras that are rotatable as an assembly around said longitudinal axis and have a field of view directed to permit closer inspection of an inner surface of the pipe; and
b) the housing has a fixed rear part and a front part that is carried by the rear part and rotatable around said longitudinal axis, all of the cameras being fixed in the rotatable front part of the housing.

By having at least two cameras for the closer inspection of the inner wall of the pipe, it is possible to inspect a larger area without any rotation at all, and if a rotation is necessary, the rotation angle required is much smaller than when a single camera is used. Thus, using the at least two cameras instead of just one is time-saving.

Said at least two rotatable cameras have their fields of view directed obliquely forward or perpendicularly to the longitudinal axis. By having the fields of view directed obliquely forward, the diameter of the housing may be reduced and the windows for the cameras are less exposed to mechanical damage and accumulation of dirt. This also makes it possible to make the exterior of the housing at the rear of the cameras even and streamlined, so that the risk of the inspection device getting stuck in the pipe will be reduced.

Suitably, the at least two rotatable cameras have their fields of view directed to be in the range of 20-90° from the forward direction, preferably 30-80°, more preferably 35-60°.

To simplify the structure of the inspection device, all of the cameras suitably are fixed on a transverse camera bracket, and the camera bracket is mounted on a printed circuit board fixed in the rotatable front part of the housing.

For rotating the front part of the housing in relation to the fixed rear part of the housing, it is suitable to mount an electric motor on the printed circuit board, and to provide a gear train that is driven by the motor to rotate the front part of the housing.

It is preferred that two of the rotatable cameras are located diametrically opposite each other in relation to the longitudinal axis. Thereby, these two cameras cover a large portion of the circumferential area of the adjacent inner wall of the pipe, and any rotation to necessary for covering any possibly remaining uncovered circumferential area will be comparatively small and quickly done.

When the rotatable cameras include a third camera, it suitably is located halfway between the two diametrically opposite rotatable cameras.

Preferably, the rotatable cameras are located on an imaginary circumferential circle in relation to the longitudinal axis, and on each side of each rotatable camera along the circumferential circle, an LED illumination assembly is provided for illuminating the inner surface of the pipe obliquely forward. Thereby the LED illumination assemblies give sufficient light both for the camera having a forward-looking field of view and for the at least three cameras that have their fields of view directed obliquely forward.

The motor suitably is placed in a position that is diametrically opposite to that of a common center of gravity of the rotatable cameras in relation to the longitudinal axis. Thereby, gravitational forces will try to counteract any undesired rotation of the inspection device.

Further, it is suitable that the inspection device is adapted to be controlled from a control unit, and the device includes a microprocessor, preferably mounted on the printed circuit board, adapted to be controlled from the control unit for selecting and operating a desired one of the cameras, and for operating the LED illumination assemblies and the motor.

Still further, it is preferred that the inspection device includes a tilt sensor, preferably mounted on the printed circuit board, for sensing the attitude of the rotatable front part of the housing and, in case of detecting a deviation from a desired attitude, sending a signal to the processor to correct the deviation.

Further, each of the cameras suitably has an angular field of view in the range of 45-135°, preferably 60-120°, more preferably 80-100°, the rotatable cameras preferably are at least three, and the rotatable cameras preferably are set in the range of 60-120° apart from the closest located rotatable camera, preferably 80-90°. Thereby, the rotation angle required for inspecting 360° is much smaller than when a single camera is used. Thus, using the at least three cameras instead of just one is time-saving.

Further, the rotatable cameras are preferably mounted within a semicircle of the cross-section of the device. Preferably one camera at respectively end of the semicircle and any additional cameras equidistantly distributed within the semicircle. Preferably the opposite semicircle not containing cameras is arranged to face the bottom of a pipe when pushing or pulling the device in a pipe. Thereby the wear of the protective glass covering the camera lenses can be reduced. When the device has reached a point where it is desirable to look downward the cameras can be rotated.

BRIEF DESCRIPTION OF THE DRAWINGS

In the following, the invention will be described in more detail with reference to preferred embodiments and the appended drawings.

MODE(S) FOR CARRYING OUT THE INVENTION

Figure 1:
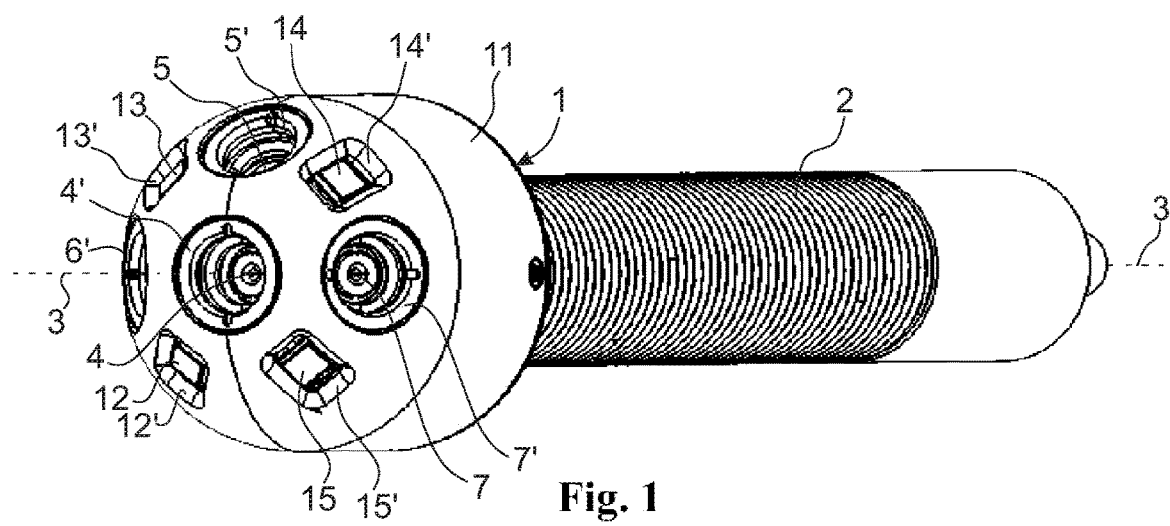
FIG. 1 is a perspective view of a pipe inspection device in accordance with a preferred embodiment of the present invention.
Figure 2:
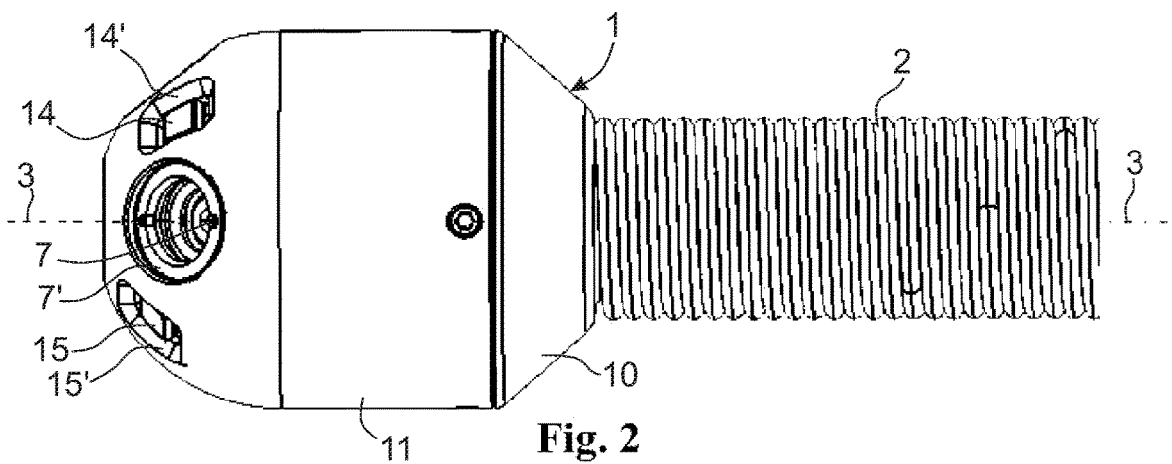
FIG. 2 is a side view of a front end of the device of FIG. 1.
Figure 3:
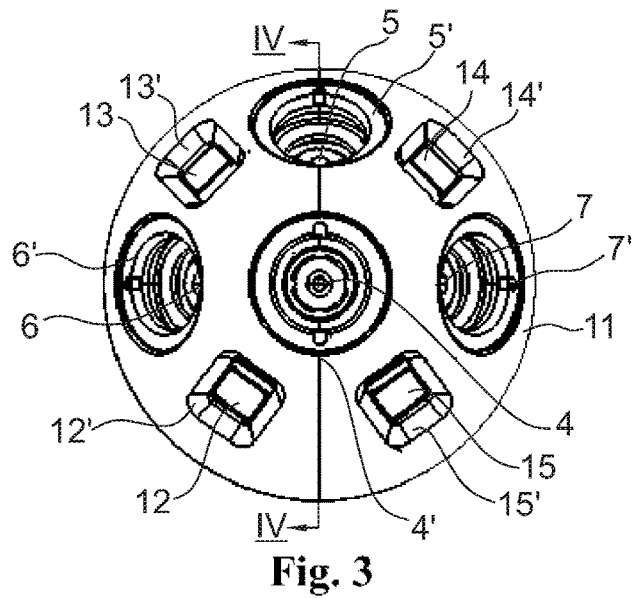
FIG. 3 is a front view of the device of FIGS. 1 and 2.

The pipe inspection device shown in the drawings includes a generally cylindrical housing 1 fixed to a semi-rigid rod 2 in the shape of a helical spring forming a protective tube for a multi-wire cable for supply of electrical power to the device from a supply outside the pipe and at the same time image signals from a camera to a monitor outside the pipe. The housing 1 has a longitudinal axis 3 and inside the housing a camera 4 having a forward-looking field of view and a camera 5 that is rotatable around said longitudinal axis and has a field of view directed to permit closer inspection of an inner surface of the pipe. Further, means that will be described below are provided for rotating the rotatable camera 5 to direct its field of view against an area of the inner surface of the pipe to be inspected more closely.

According to the present invention, in addition to the camera 4 having a forward-looking field, the inspection device has at least two cameras 5-7 that are rotatable as an assembly around said longitudinal axis 3 and have a field of view directed to permit closer inspection of an inner surface of the pipe. The at least two rotatable cameras 5-7 have their fields of view directed obliquely forward or perpendicularly to the longitudinal axis 3. In the preferred embodiment shown in the drawings, they have their fields of view directed obliquely forward, suitably in the range of 20-90° from the forward direction, preferably 30-80°, more preferably 35-60°. Thereby, the diameter of the housing 1 may be reduced and windows for the cameras are less exposed to mechanical damage and accumulation of dirt. This also makes it possible to make the exterior of the housing 1 at the rear of the cameras even and streamlined, so that the risk of the inspection device getting stuck in the pipe will be reduced.

Preferably, three cameras 5, 6, and 7 are used, but if desired it is, of course, also possible to use four or more cameras. Two cameras may also be used. Further, the housing 1 has a fixed rear part 10 and a front part 11 that is carried by the rear part 10 and rotatable around said longitudinal axis 3, all of the cameras 4-7 being fixed in the rotatable front part 11 of the housing 1. By rotating the front part 11, the field of view of at least one of the cameras 6 and 7 can be directed toward the area to be inspected.

Figure 4:
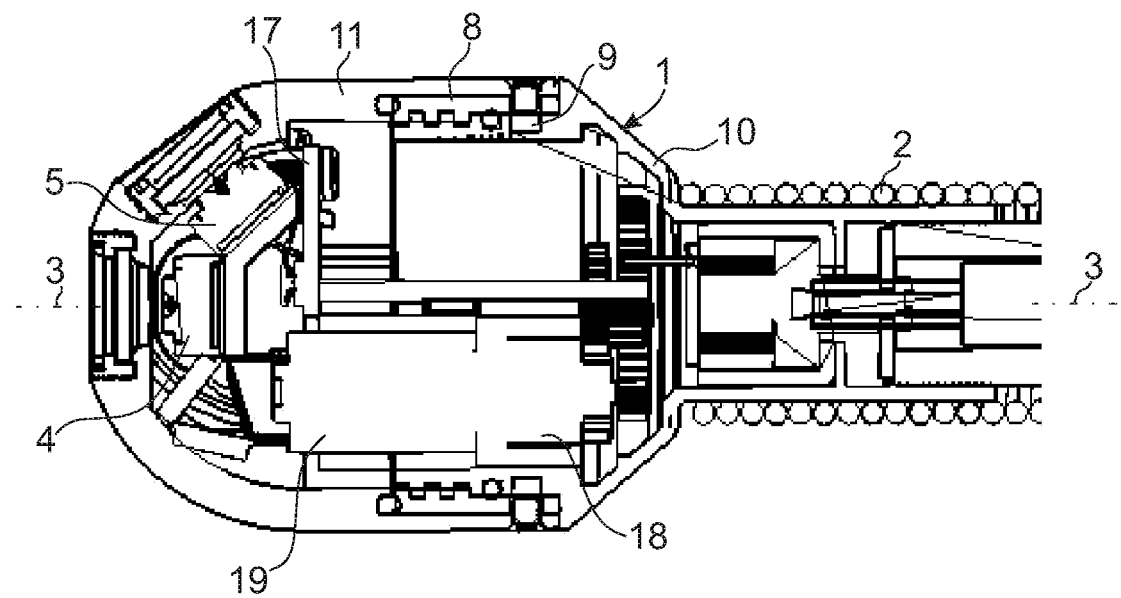
FIG. 4 is a longitudinal cross sectional view of the forward end of the device of FIGS. 1-3.
Figure 5:
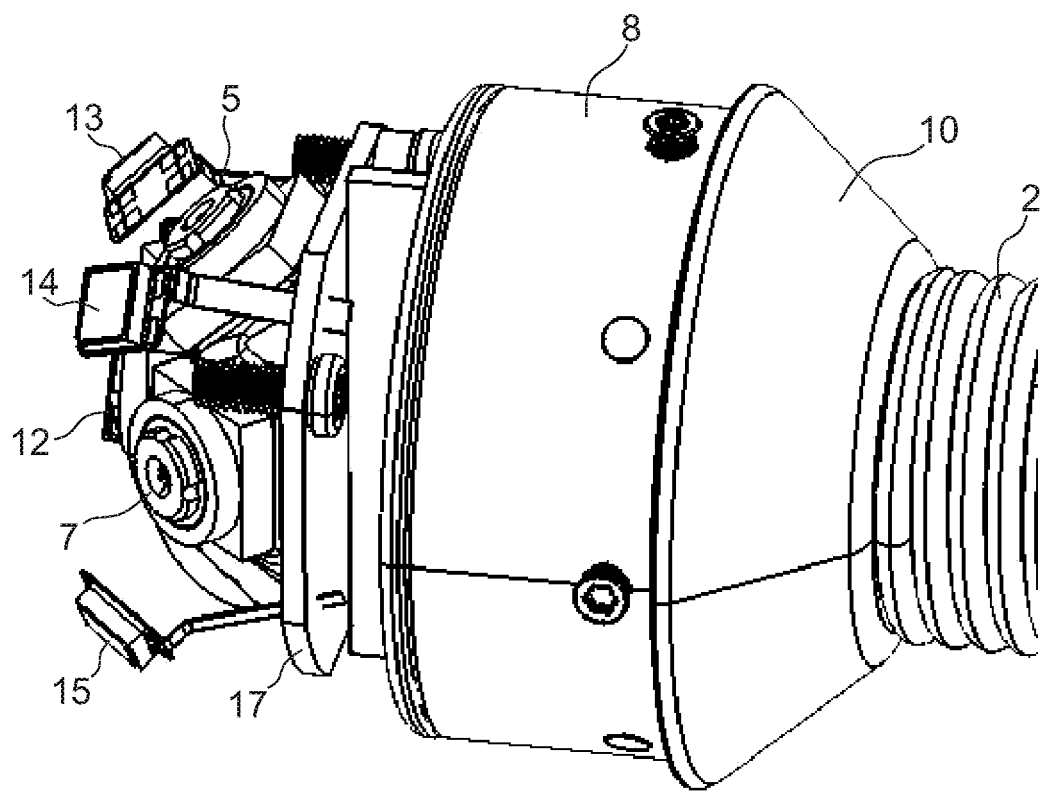
FIG. 5 is a perspective view of some interior components of the inspection device of FIGS. 1-4 and shows inter alia two cameras and four LED illumination assemblies attached to a printed circuit board, and the rear part of the housing partly surrounded by a pressure seal bushing.

To avoid that liquid leaks into the housing 1, a pressure seal bushing 8 with O-rings is interposed between the rotary front part 11 and the fixed rear part 10 as shown in FIGS. 4 and 5. The pressure seal bushing 8 is fixed by screws in the rotary front part 11 and has radial dowels (not shown) that project into a circumferential groove 9 in the fixed rear part 10 to lock the parts 10 and 11 to each other while permitting rotation.

As described above, said at least two rotatable cameras 6, and 7 preferably have their fields of view directed obliquely forward, and the front part 11 of the housing 1 has a generally half-spherical nose with windows 4'-7' for the cameras 4-7. In the shown preferred embodiment, two (6, and 7) of the rotatable cameras are located diametrically opposite each other in relation to the longitudinal axis 3. The possible third one 5 of the rotatable cameras, also having its field of view directed obliquely forward, is located halfway between them. Thereby, the fields of view of these three cameras 5-7 cover a large portion of the circumferential area of the adjacent inner wall of the pipe, and any rotation to necessary for covering any possibly remaining uncovered circumferential area of the inner wall of the pipe will be small and quickly done. To protect the cameras 4-7, each window 4'-7' is covered by a sapphire glass (not shown) pressed against an O-ring (not shown) by a nut ring.

The rotatable cameras 5, 6, and 7 are located on an imaginary circumferential circle in relation to the longitudinal axis 3, and on each side of each rotatable camera 5, 6, and 7 generally along the circumferential circle, an LED illumination assembly 12-15 is provided for illuminating the inner surface of the pipe obliquely forward. Thereby the LED illumination assemblies 12-15 give sufficient light both for the camera 4 having a forward-looking field of view and for the at least three cameras 5-7 that have their fields of view directed obliquely forward. The generally half-spherical nose of the front part 11 of the housing 1 has window openings 12'-15' for the LED illumination assemblies 12-15.

In the preferred embodiment shown in the drawings, each of the cameras 4-7 has an angular field of view of 90°, the at least three rotatable cameras 5-7 are set 90° apart, and the rotary front part 11 of the housing 1 is rotatable ±90° in relation to the fixed rear part 10. Thus, without requiring any time-consuming rotation, they cover together an angle of 270°, and the rotary front part 11 of the housing 1 with the cameras can easily and quickly be rotated to cover the remaining 90° if necessary. Thereby, the rotation angle required is much smaller than when a single camera is used. Thus, using the at least three cameras 5-7 instead of just one is time-saving. In addition, when the inspection device is being moved through a pipe, and a wall area to be inspected more closely leaves the field of view of the front camera due to the forward motion of the inspection device, the wall area in question most likely will be visible in one of the at least three cameras 5-7, which together and without requiring any rotation cover an angle of 270°.

Figure 6:
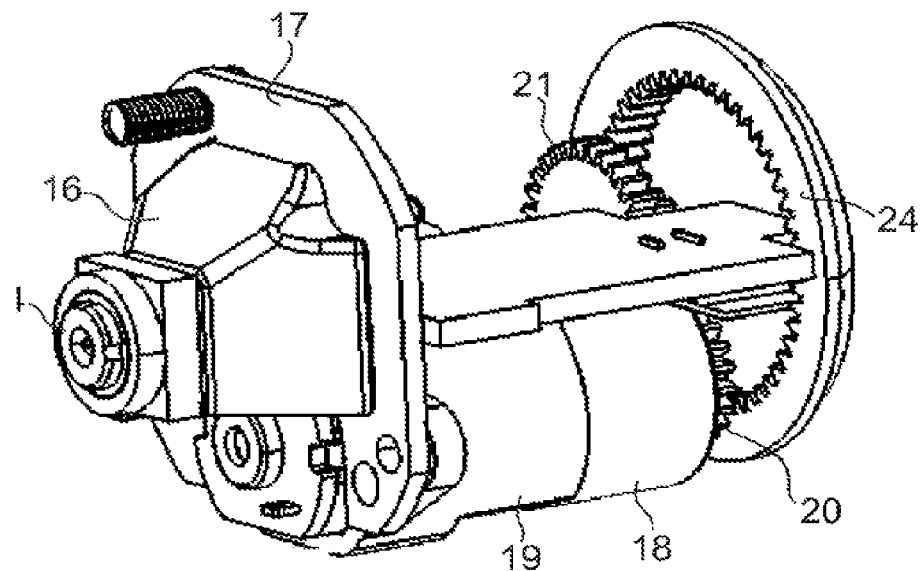
FIG. 6 is a perspective view of some interior components of the inspection device of FIGS. 1-4 and shows inter alia a camera mounted on a camera bracket, a printed circuit board, a motor, and a gear train.

All of the cameras 4-7 are fixed on a transverse camera bracket 16, which is mounted on a printed circuit board 17 fixed in the rotatable front part 11 of the housing 1. The camera bracket 16 is best shown in FIG. 6, where, in order not to overcrowd the figure, only the camera 4 having a forward-looking field of view is shown mounted on the bracket 16. FIG. 6 also shows most of the means for rotating the front part 11 of the housing 1. These means comprise an electric motor 18 mounted in a holder 19 that is fixed to the printed circuit board 17. The motor 18 suitably is placed in a position that is diametrically opposite that of a common center of gravity of the rotatable cameras 5-7 in relation to the longitudinal axis 3, i.e. usually diametrically opposite the position of the intermediate one 5 of the rotatable cameras 5-7. Thereby, gravitational forces will try to counteract any undesired rotation of the inspection device.

Figure 7:
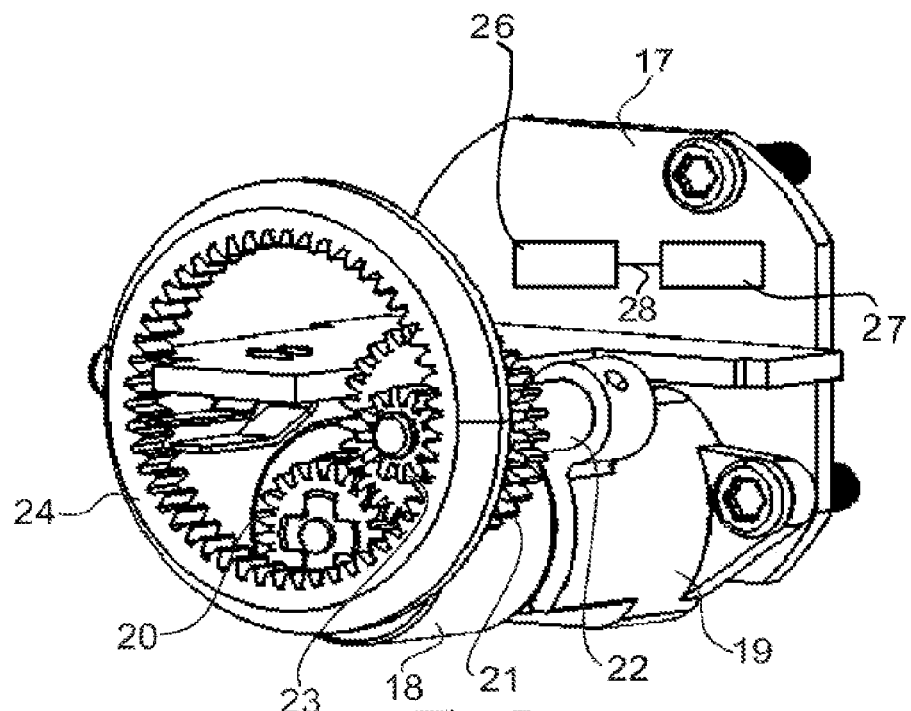
FIG. 7 is a perspective view of the internal components of FIG. 5 but viewed from an opposite direction.

A gear train is driven by the motor 18 for rotating the front part 11 of the housing 1 in relation to the fixed rear part 10 of the housing 1. The gear train is best shown in FIG. 7 and comprises a first gear 20 fixed on the outgoing shaft of the motor 18, a second gear 21 mounted on a support shaft 22 carried parallel to the motor 18 by the motor holder 19, a third gear 23 coaxial and integral with the second gear 21, and an internal fourth gear 24. Thus, the motor 18 rotates the first gear 20 that drives the second gear 21, which is larger than the first gear 20. Thereby, the integral third gear 23, which is smaller than the second gear 21, is rotated, and as it is in meshing engagement with the internal fourth gear 24, which is fixed in the rear part 10 of the housing 1, the front part 11 of the housing 1 with the cameras 4-7 and the LED illumination assemblies 12-15 will be rotated in relation to the fixed rear part 10 of the housing 1. As an example, the first gear 20 may have 20 teeth, the second gear 21 30 teeth, the third gear 23 12 teeth, and the internal fourth gear 24 50 teeth to give a desired reduction of the motor rpm.

Suitably, as is well known in the art, the pipe inspection device is adapted to be controlled from a control unit 26, and the printed circuit board 17 includes a microprocessor 27, which is adapted to be controlled via a multi-wire cable 28 from the control unit for selecting and operating a desired one of the cameras 4-7, and for operating the LED illumination assemblies 12-15 and the motor 18. In the shown preferred embodiment, the cable includes six parallel wires forming three pairs. One pair carries the image from the selected operative camera, another carries data communication to the microprocessor, and a third pair carries supply current. Conventional slip rings (not shown) are provided where necessary to permit the signals to pass through a rotary joint. The control unit is also connected to a monitor (not shown) for displaying the images from the cameras.

Further, each of the cameras 4-7 suitably has an angular field of view in the range of 45-135°, preferably 60-120°, more preferably 80-100°, the rotatable cameras 5-7 preferably are at least three, and the rotatable cameras 5-7 preferably are set in the range of 60-120° apart from the closest located rotatable camera, preferably 80-90°. Thereby, the rotation angle required for inspecting 360° is much smaller than when a single camera is used. Thus, using the at least three cameras 5-7 instead of just one is time-saving.

The control unit may as an example include the following functions:

Selection of camera

Rotation of the front part of the housing (overriding the tilt sensor) to view bottom areas of the pipe wall Auto mode (tilt sensor controlling the attitude of the cameras)

Adjustment of light intensity of the LED illumination assemblies

The present invention is not restricted to the preferred embodiment described and shown in the drawing but may be modified with the scope of the appended claims. As an example, it is possible to use more than three rotatable cameras 5-7 having their fields of view directed for close inspection of the inner wall of the tube, and each of them may have an angular field of view of other than 90°. Further, it would be possible to mount the at least three cameras 5-7 having their fields of view directed strictly sideways, i.e. perpendicularly to the longitudinal axis 3. However, obliquely forward directed fields of view are preferred in view of the advantages gained thereby as described above. It would also be possible to use another transmission than the described gear train to rotate the front part 11 with the cameras 4-7 in relation to the fixed rear part 10 of the housing 1.

INDUSTRIAL APPLICABILITY

The pipe inspection device of the present invention is applicable for inspecting sewer, water and well pipes for blockages and defects. Electrical conduits and other long narrow passages may be similarly inspected.

The invention claimed is:

1. A pipe inspection device comprising:

a semi-rigid rod;
a housing fixed to the semi-rigid rod and having a longitudinal axis, wherein the housing comprises a fixed rear part of the housing and a front part of the housing carried by the rear part of the housing and rotatable around the longitudinal axis, wherein the rear part of the housing is disposed at a rear portion of the housing and the front part of the housing extends forwardly of the rear part of the housing, and a pressure seal bushing is interposed between the front part of the housing and the rear part of the housing;
a first camera inside the housing having a forward-looking field of view;
at least three rotatable cameras fixed in the front part of the housing and rotatable as an assembly around said longitudinal axis, wherein the at least three rotatable cameras have their fields of view directed obliquely forward, wherein the at least three rotatable cameras are fixed in window openings at an exterior of the front part of the housing and the front part of the housing has a reduced diameter at the window openings; and
a motor for rotating the at least three rotatable cameras with their fields of view directed against the inner surface of the pipe.

2. The device according to claim 1, wherein said at least three rotatable cameras have their fields of view directed to be in the range of 20-90° from the forward direction.

3. The device according to claim 1, wherein said at least three rotatable cameras have their fields of view directed to be in the range of 30-80° from the forward direction.

4. The device according to claim 1, wherein said at least three rotatable cameras have their fields of view directed to be in the range of 35-60° from the forward direction.

5. The device according to claim 1, wherein all of the cameras are fixed on a transverse camera bracket mounted on a printed circuit board fixed in the rotatable front part of the housing.

6. The device according to claim 1, wherein the motor comprises an electric motor mounted on a printed circuit board, and a gear train is driven by the electric motor for rotating the front part of the housing in relation to the fixed rear part of the housing.

7. The device according to claim 1, wherein the rotatable cameras are located on an imaginary circumferential circle in relation to the longitudinal axis, and on each side of each of the at least three rotatable cameras along the circumferential circle, an LED illumination assembly is provided for illuminating the inner wall of the pipe obliquely forward.

8. The device according to claim 1, wherein the motor is placed in a position that is diametrically opposite to that of a common center of gravity of the at least three rotatable cameras in relation to the longitudinal axis.

9. The device according to claim 1, further comprising a control unit; wherein the device is adapted to be controlled from the control unit, and wherein the device includes a microprocessor adapted to be controlled from the control unit for selecting and operating one of the cameras, and for operating LED illumination assemblies and the motor.

10. The device according to claim 1, further comprising a tilt sensor configured for sensing the attitude of the rotatable front part of the housing.

11. The device according to claim 1, wherein each of the cameras has an angular field of view in the range of 45-1350.

12. The device according to claim 1, wherein each of the cameras has an angular field of view in the range of 60–120°.

13. The device according to claim 1, wherein the rotatable front part of the housing is rotatable at least ±90° in relation to the fixed rear part of the housing.

14. The device according to claim 1, wherein the at least three rotatable cameras are set so that there is at least a 150° section void of rotatable cameras.

15. The device according to claim 1, wherein the at least three rotatable cameras are set so that there is a 180° section void of rotatable cameras.

16. A pipe inspection device comprising:
a semi-rigid rod;
a housing fixed to the semi-rigid rod and having a longitudinal axis, wherein the housing comprises a fixed rear part of the housing and a front part of the housing carried by the rear part of the housing and rotatable around the longitudinal axis, wherein a bushing is interposed between the rotatable front part of the housing and the fixed rear part of the housing, wherein the bushing partially surrounds the fixed rear part of the housing;
a first camera inside the housing having a forward-looking field of view;
three rotatable cameras fixed in the front part of the housing and rotatable as an assembly around said longitudinal axis, wherein the three rotatable cameras are mounted within a semicircle of a cross-section of the pipe inspection device, wherein two of the three rotatable cameras are located diametrically opposite each other in relation to the longitudinal axis, and wherein a third one of the three rotatable cameras is located halfway between the diametrically opposite rotatable cameras, wherein the three rotatable cameras are set so that there is a 180° section void of rotatable cameras, wherein the three rotatable cameras have their fields of view directed obliquely forward in the range of 20-90° from the forward direction, wherein the three rotatable cameras are fixed in window openings at an exterior of the front part of the housing and the front part of the housing has a reduced diameter at the window openings; and
a motor for rotating the three rotatable cameras with their fields of view directed against the inner surface of the pipe.

17. The device according to claim 1, wherein the pressure seal bushing includes O-rings.

18. The device according to claim 16, wherein the bushing comprises a pressure seal bushing with O-rings.

* * * * *